United States Patent Office 3,817,772
Patented June 18, 1974

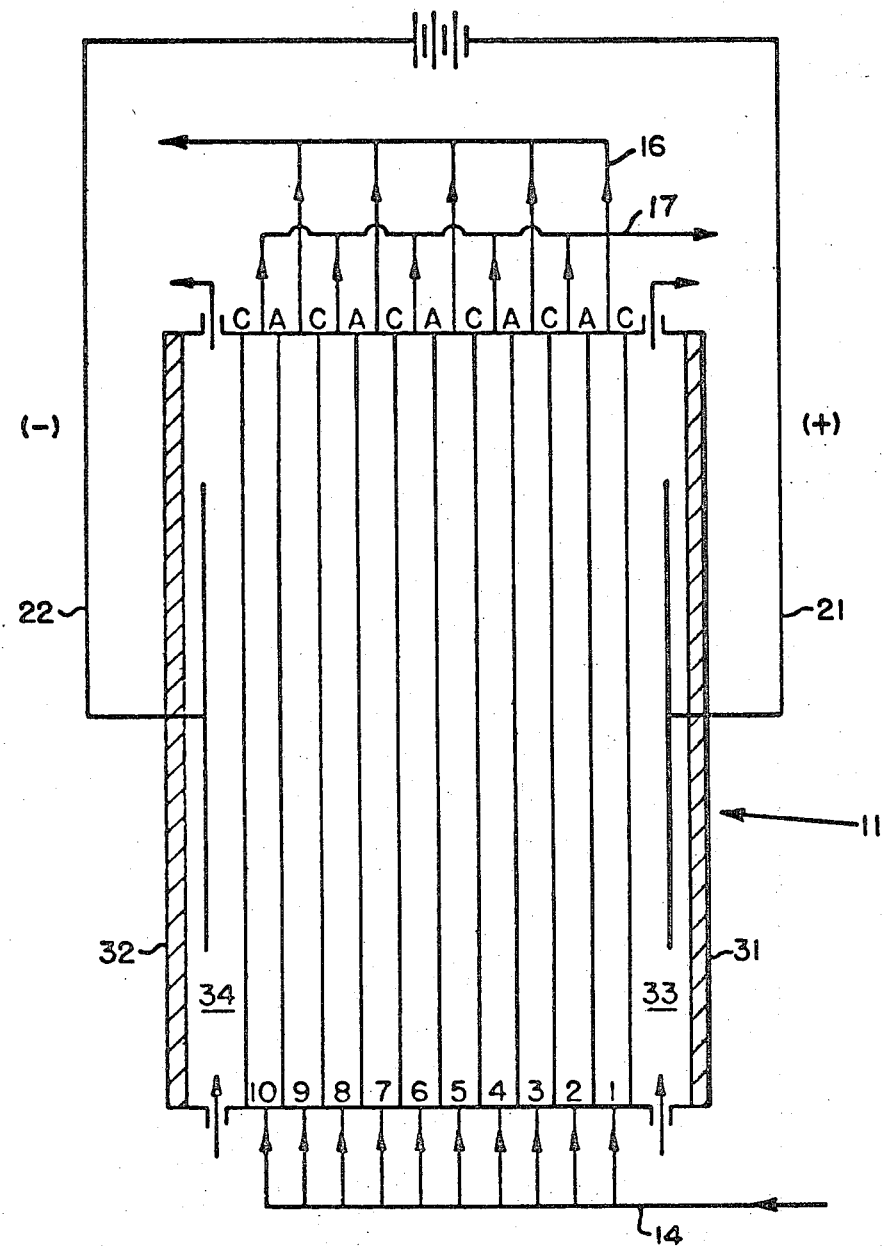

3,817,772
SEMI-PERMEABLE MEMBRANES AND METHOD OF PRODUCTION
Allyn H. Heit, San Mateo, Calif., assignor to Sybron Corporation, Rochester, N.Y.
Continuation of abandoned application Ser. No. 802,025, Feb. 25, 1969. This application Aug. 5, 1971, Ser. No. 169,488
Int. Cl. B44d 1/32
U.S. Cl. 117—11
15 Claims

ABSTRACT OF THE DISCLOSURE

An improved heterogenous semi-permeable membrane made by the process of forming the membrane from a solution of suitable polymeric binder and an inorganic salt and lixiviating the film to remove the inorganic salt from the binder matrix. The film prior to lixiviation, may contain up to 80% by weight of the binder of inorganic salt. Suitable ion exchange material may be dispersed throughout the membrane to give permselective characteristics thereto.

Membranes made according to this method exhibit resistance to organic and inorganic fouling and thus may be used at higher current densities. In addition, membranes made according to this method are characterized by relatively low areal resistance.

---

This application is a continuation application of copending application Ser. No. 802,025, filed Feb. 25, 1969, and now abandoned.

This invention relates to electroconductive membranes and to a process for making the same, more particularly, this invention relates to membranes having a controllable, open structure and controllable degree of semi-permeability, said membranes having improved resistance to organic and inorganic fouling.

BACKGROUND OF THE INVENTION

In recent years, great interest has been generated in the electrodialytic purification of liquids, in particular, purification of brackish water to produce potable water. Electrodialysis involves the transport of certain ions through a membrane barrier with the driving force being provided by an electrical potential which is imposed across the solution being treated and the membrane, whereby anions and cations are transported from a dilution stream into a concentrating stream flowing past one face of the membrane. The purpose of the membrane is to provide an ion permselective barrier between the treated liquid of the dilution stream and a concentrating stream which receives the anions and cations which penetrate the membrane barrier. Membranes used in electrodialysis may range from highly anionic through neutral to highly cationic. The choice of the particular membrane, i.e., the degree and type of inion activity, depends on the conditions of the solution being treated and the particular design of the electrodialytic unit being used. Conventional electrodialytic units are composed of a series of cells or compartments which cells or compartments are defined by having one membrane wall having anion exchange properties and an opposite membrane wall having cation exchange properties. The purpose of providing membrane barriers having ionic characteristics is to provide a barrier which selectively allows certain ions to pass through while retaining or repelling other ions. For example, a membrane having anion exchange characteristics is selectively permeable to anions (anion permeselective) while repelling substantially all cations attempting to pass through. The same is true for membranes having cation exchange properties, such membranes would thus be selectively permeable to anions (anion permselective) while repelling substantially all the anions which attempt to pass through.

Electrodialytic units employing conventional membranes are particularly subject to membrane fouling both by the organics contained in the liquid being treated and by the formation of inorganic scale, particularly on the anion membrane. This fouling, if unchecked, results in an impermeable ion barrier causing a complete breakdown of the process and increased operating costs due to greater power demands required to transport ions and maintenance costs involved in dismanteling the unit and cleaning the membranes.

Organic fouling is caused by the absorption of anionic organic entities on the surface of the membrane facing the anode. The absorption of such organic molecules is marked by a rise in the electrical resistance of the membrane and a loss of ion selectivity of the membrane.

In the course of electrodialytic treatment of liquids containing water, a certain amount of the water molecules are split into hydrogen and hydroxyl ions. The greater the potential the greater the amount of water splitting which takes place. The hydrogen ions of the dilution stream are repelled by the anion permselective membrane and, under the influence of the electrical potential, move away from the anion membrane towards the cation permselective membrane into the concentration stream or are carried off in the dilution stream. The hydroxyl ions being impelled by the potential towards the anode are concentrated in the interface between the dilution stream and the anion membrane producing a zone of high alkalinity which eventually makes the membrane alkaline as well. The cations, particularly calcium and magnesium, ions which are present in the high alkalinity interface area react with the hydroxyl ions to form hydroxides. Calcium and magnesium hydroxide in particular are insoluble and precipitate on to the membrane forming a deposit, referred to as inorganic fouling, which plugs the membrane. In addition certain amounts of cations such as magnesium and calcium will be found in the gel water within the membrane and the deposit will be formed within the membrane itself and eventually will form even on the concentration stream face of the membrane. These deposits cause an increase in membrane electrical resistance thereby requiring an increase in potential in order to maintain the current density at which the membrane is operated. However, as the potential across the membrane is increased so is the rate of water splitting and the resulting rate of formation of insoluble deposits is also increased.

The problem of inorganic fouling of anion permselective membranes is particularly serious in the treatment of brackish water to make it potable since such waters usually contain substantial amounts of magnesium bicarbonate which, at alkaline pH ranges, is reduced to magnesium carbonate which precipitates out and adds to the inorganic fouling problem. Using conventional membranes, electrodialytic units must be shut down periodically in order to remove the inorganic and organic deposits from the membranes. The short operating life of conventional membranes has seriously hampered attempts to treat liquids, particularly brackish water, electrodialytically to remove or reduce the ionizable impurities therefrom.

Various attempts have been made to increase the useful life of membranes, particularly anion membranes, in electrodialytic processes.

A method commonly used to avoid inorganic fouling is to operate the electrodialysis cells at low current densities in order to reduce the degree of water splitting and the resulting high alkalinity in the zone immediately adjacent the dilution stream face of the anionic membrane and of the membrane itself. Such action results in low productivity—as defined by such parameters as gallons of product per square foot of membrane.

Another method to avoid inorganic fouling has been to use neutral membranes in place of the anionic membranes in making the cells of the electrodialytic unit. However, using neutral membranes there is substantial salt leakage through the membrane from the concentration stream into the dilution stream and it is usually necessary to recirculate the dilution stream effluent one or more times through the unit in order to achieve a satisfactory product. Such processes are not efficient or economical.

Accordingly, it is an object of this invention to provide an improved membrane with increased resistance to organic and inorganic fouling and which can be operated at more productive current densities.

It is another object of the present invention to provide an improved membrane having low ohmic resistance in electrolytic solutions and having an easily obtained and readily reproducible semipermeability.

It is another object of this invention to provide an improved membrane which can be produced having anionic, cationic, neutral or bi-polar characteristics.

It is another object of this invention to provide a process for producing such membranes.

These and other objects and advantages of the present invention will become apparent upon consideration of the following detailed description and the novel features thereof will be particularly pointed out hereinafter in connection with the appended claims.

DESCRIPTION OF DRAWING

The figure is a schematic representation of an electrodialysis unit showing the arrangement of membranes therein.

SUMMARY OF THE INVENTION

Briefly stated, this invention comprises an improved heterogenous membrane having anionic, cationic, neutral or bipolar characteristics comprising from 0 to about 80 weight percent based on weight of membrane film of an ion exchange material dispersed in and bonded by a matrix of a polymeric binder material and an inorganic salt. The inorganic salt is subsequently removed by lixiviating the membrane in a solvent in which only the inorganic salt is soluble, whereby the inorganic salt is dissolved and dispersed out of the membrane structure leaving behind a multiplicity of interstices within the membrane matrix structure. The lixiviation of the inorganic salt with the formation of interstices in the matrix structure causes the resulting membrane to be semi-permeable so that mobile hydrogen ions which are added to the concentration streams are able to pass into and through the membrane, even when the membrane is anion permselective only. In this manner it is believed that high alkalinity of membrane and of the region immediately adjacent the anion permselective membrane in electrodialytic processes is avoided and the formation of inorganic deposits are substantially reduced or, in many cases, eliminated. Membranes made according to this invention can be operated at higher current densities which results in improved operation and increased production rates. The degree of openness of membrane structure and the resultant degree of semipermeability is readily reproducible between individual membranes made according to this invention since it is controlled by the amount of inorganic salt present in the matrix. In addition, the degree of openness of structure can be changed simply by varying the proportions of inorganic salt present in the membrane structure during the production of the membrane.

In addition, membranes made in accordance with this invention are highly resistant to organic fouling. The open structured semi-permeable membranes of this invention are further characterized by having a substantially low areal resistance, thereby allowing them to be operated economically with less power loss.

In carrying out the process of this invention, a solution is formed comprising a neutral polymeric binder and an inorganic salt co-dissolved in a common solvent and a thin film is formed therefrom. Although not essential in this invention, it is preferred that the thin film be deposited on a suitable support member for the purpose of providing additional mechanical strength in the finished membrane. Highly preferred as support members in this invention are synthetic fibers, either in the form of woven fabric or as non-woven felt, wool, matte and the like. Natural fibers may be used as well. Fibers produced from the following materials have been found useful in this invention—polyesters, nylon, cotton, regenerated cellulose, acrylics, polypropylene, isotoctic polyethylene, polyolefins, fluorenated hydrocarbons and the like.

The polymeric binder used in producing the membrane of this invention is a neutral material, i.e., having no available ion exchange sites in the polymer chain. In addition to being neutral, it is important that the binder material be resistant to hydrolysis, oxidation and other reactions causing degradation. Thus, the choice of a particular resin to form a binder material of the membrane of this invention depends in large measure upon the conditions under which the membrane is to be operated. Polymers such as polyvinylidene fluoride, polyvinyl chloride-polyvinyl acetate co-polymer, polyvinylidene chloride and the like are preferred binder materials. These polymers are substantially neutral, readily co-soluble with inorganic salts, and possess the desired chemical and physical properties which make them useful as membranes in the production of potable water from brackish water.

The primary requisite for the inorganic salt used in forming the membrane of this invention is that it must be co-soluble with the polymeric binder material in a common solvent and in addition, must be soluble in a lixiviating solvent in which the binder is insoluble so that it can be readily dissolved and easily dispersed from the membrane during the production of membranes in accordance with this invention. In addition the salt must be thermally stable under hot pressing conditions employed in the production of membranes in accordance with this invention and must be substantially chemically inert with respect to the binder and ion-exchange resin. Examples of suitable inorganic salts which may be used in this invention are the iodides and bromides of the alkali metals such as for example, sodium, lithium and potassium iodide which are chemically inert with respect to the membrane components and processing equipment and thermally stable under hot pressing conditions encountered in the production of membranes in accordance with the invention.

Although the proportion of inorganic salt to polymeric binder may vary widely depending on desired open structure of the finished membrane, the inorganic salt should not exceed about 80 percent on a dry weight basis of said binder and inorganic salt.

When the proportions of inorganic salt exceed about 80 weight percent, it has been found that membrane strength is so reduced that the membrane is for all practical purposes useless.

The solvent used to co-dissolve the binder and the inorganic salt is characterized by a high solvent action on the binder material and on the inorganic salt. Sufficient solvent must be used in order to completely dissolve the binder and the inorganic salt, although the proportion of solvent to solute is not critical and is mainly dependent on the desired viscosity of solution which is dictated by the method of forming the film. For example, if it is desired to cast the film, the solution can be more viscous and consequently less solvent is required than if it is desired to coat a film on support material by dipping or spraying, both of which techniques require a more dilute and less viscous solution. Thin film-forming techniques, such as coating, dipping, spraying, casting and the like are well known to those skilled in the art, and any method which will provide a thin film can be employed in the invention. Among the solvents which have a high solvent action on polymeric binder materials and inorganic salts are dimethyl formamide, dimethyl acetamide, dimethyl sulfoxide, propylene carbonate, butyrolacetone, tetrahydrofuran, methyl ethyl ketone acetone, methyl propyl ketone and homologues thereof. The particular solvent employed is not critical so long as both binder and inorganic salt are soluble therein to the extent that sufficient quantities of both binder and salt can be co-dissolved to form the membrane film.

In addition to containing a binder material and inorganic salt, the thin film may also incorporate finely divided ion exchange material which is dispersed throughout the film. The ion permselectivity of the film can be readily controlled by controlling the type and proportion of the ion exchange material contained therein.

In accordance with this invention, the finished membrane may comprise up to 80 weight percent of ion exchange material, and thus, the finished membrane may have permselective characteristics ranging in any degree from strongly anionic through mildly anionic, neutral, mildly cationic and strongly cationic. The ion exchange material may be dispersed in the solution of binder and inorganic salt, or may be dispersed in film formed from the solution. It is preferred to disperse the ion exchange material in the solution prior to forming the film, since in this manner a complete coating of binder over the ion exchange material is assured thereby substantially increasing the resistance of the finished membrane to organic fouling. The ion exchange material, as mentioned above, can be either an anion or a cation permeable resin and may be a naturally occurring ion exchange reactive material, such as the zeolites or glauconites or a synthetic ion exchange resin. For example, synthetic ion exchange resins such as melamine-guanidine formaldehyde, urea-guanidine formaldehyde, aminated chloroalkylated copolymer of monovinyl and divinyl aromatic hydrocarbons, phenol-sulfonic acid formaldehyde resin, mineral acid treated polystyrene, or carboxylic acid treated polystyrene may be used. It is preferred that the finely ground ion exchange material have a particle size in the range of 0.05 to about 5.0 microns. Larger particles are difficult to disperse uniformly in the finished membrane and in addition provide a low surface area to mass ratio while smaller particles are difficult to work with.

As mentioned above, the solution can be formed into a thin film by a variety of ways, as for example, dipping, coating, spraying and casting by procedures well known to those skilled in the art. A preferred method consists of forming a thin film on an inert fibrous support member, which film is formed by dipping the support member in a trough containing the film-forming solution and then passing the dipped cloth between spacer bars which are separated by a predetermined known distance thereby to provide on the support material a wet film of substantially uniform thickness. In producing membranes in accordance with the invention, the spacer bars have been spaced apart from between about 4 mils to about 25 mils, depending on the desired thickness of the finished membrane and the thickness of the fibrous support member. After its formation, the thin wet film is allowed to dry in order to remove a major portion of the common solvent and allow the binder to set up so that the film has sufficient "green strength" for later operations.

Drying is carried out by conventional methods at temperatures ranging from room temperature or at temperatures as high as about 150° C. The preferred drying temperatures ranges from about 90° C. to about 120° C. The length of the drying period is, of course, inversely proportional to the drying temperature. Drying can be carried out until substantially all of the solvent has been removed, however, it is preferred that drying be continued until about 95 percent of the solvent is removed from the film.

It is highly preferred to have about 5 percent of the solvent remain in the film after drying in order that the remaining solvent can act as a plasticizer for the polymer binder during subsequent pressing and curing operations. It is to be noted, however, that pressing can be carried out with dry film or a suitable plasticizer may be added to the binder material, in either case drying can be carried out until substantially all of the solvent is removed from the film.

It is within the scope of this invention to form membranes consisting of more than one film. For example, it may be desired to provide a membrane having an outer neutral layer and an inner anionic permselective layer or vice versa. In addition, it may be desired to form a membrane wherein the outer portion thereof has a different degree of openness of structure than the inner portion. In such cases, membranes of this type may be formed in accordance with this invention by providing a second film over the first film, wherein the second film may contain a different ion exchange material, no ion exchange material at all, or a different proportion or inorganic salt. An overlying film can be formed on the first film after the first film has been dried. After forming the second film, it is dried in the same manner as described in the first film. The film forming and drying steps are repeated for as many films as may be desired in forming membranes according to the invention.

After forming and drying the film or films in the manner described above, curing is continued by subjecting the film or films to a pressure of about 100 p.s.i. to about 500 p.s.i. at a temperature ranging from about 100° C. to about 200° C. The pressing operation acts to complete the drying of the film forming the membrane and additionally to consolidate the components, i.e., the inert fibrous support member, if present, and the film or films to provide a smooth surface for the membrane and to insure complete flowing together of the polymeric binder to eliminate separations, cracks, pinholes and the like which may have formed during the film forming and drying operations so that the membrane is substantially unfractured. In addition, pressing acts to compress the membrane components to desired thickness, which preferably is for the membranes illustrated in the Examples, about 3.5 mils. Although, pressing time is not crtical, it has been found that best results are obtained when the membrane is pressed at curing temperature for a period of time ranging from about 0.5 to about 60 minutes. Pressing may be carried out by any commonly known method, such as for example, placing the membrane between a pair of heated metal platens. In addition, it is preferred that a sheet of release material be interposed between each metal platen and membrane to insure that the membrane can be easily separated from the platen after heating and pressing. Any suitable sheet material which will withstand the curing temperature and is non-reactive with the membrane composition may be used as a release sheet during the pressing operation of the membranes in accordance with this invention. For example, sheets made of cellophane or polyethylene terephthalate have been used successfully in this invention.

After the membrane is formed and cured as described above, it is then subjected to lixiviation in the presence of a solvent in which only the inorganic salt portion of the membrane is soluble. By this means the inorganic salt is removed from the membrane structure without forming pinholes or otherwise disrupting the structure of the membrane. Although, not fully understood, it is believed that the membrane, when placed in contact with the solvent, has a tendency to swell, which is common with most membrane substances. In the course of the swelling, the solvent is diffused into the membrane, where it causes the inorganic salt to go into solution and be dispersed out of the membrane matrix. Lixiviation can be carried out for limited time periods to remove only a portion of the inorganic salt and leave a remaining portion in the membrane. Preferably, however, lixiviation is carried out until the inorganic salt is substantially completely removed from the membrane. The inorganic salt leaves behind voids or interstices within the membrane structure, which as mentioned above allow the passage of hydrogen ions and additionally provide a path for current flow thereby reducing the areal resistance of the membrane. Semi-permeability as used herein means the ability of hydrogen ions to permeate through membranes made in accordance with this invention with minimum hydraulic leakage. Semi-permeability is determined by measuring the milliliters per minute per square foot of water, passing through the membrane at various hydraulic pressures or by measuring the gram equivalents per hour per square centimeter of a salt, acid or base passing through the membrane. Semi-permeability is controlled by the degree of openness of membrane structure, which is controlled by the proportions of inorganic salt present in the membrane film. The desired degree of semi-permeability is a matter of choice determined largely by the type of solution to which the membrane will be exposed and to the desired current densities to be employed in the electrodialysis process. If, for example, it is desired to operate at relatively low current densities the amount or degree of semi-permeability can be reduced since the danger of inorganic fouling will be substantially reduced. By way of example, when forming a membrane for the production of potable water from brackish water, it has been found that the proper degree of semi-permeability is achieved when the proportion of inorganic salt comprises about 50 weight percent of the polymeric binder and salt composition of the film after curing period.

Lixiviation can be carried out by any suitable method, such as for example by washing or soaking the finished membrane in distilled water. Lixiviation may be carried out in boiling water, thereby increasing the solubility of the inorganic salt in the water and reducing the time required to disperse the inorganic salt from the membrane. Other lixiviating solvents in which the inorganic salt is soluble, but in which the polymeric binder is insoluble may be used. For example, the primary alcohols, such as methyl alcohol and its homologues; secondary alcohols, such as isopropanol and its homologues and chloroform may be succesfully used.

Lixiviation of potassium or sodium iodide is preferably completed by conditioning the membrane in a brine solution to insure that any iodide ions remaining in the membrane structure are replaced with chloride ion. The purpose of this is to prevent the gradual bleeding out of any retained iodide ions from the membrane during use. Such bleeding, of course, is objectionable particularly when the membrane is to be used in the electrodialytic treatment of water for human or animal consumption. Lixiviation may also be carried out by in situ operations in an electrodialysis cell, in which case iodide ions are removed and additional brine treatment is unnecessary.

The following examples demonstrate, by way of illustration, a preferred method for forming membranes in accordance with this invention and as such should not be considered as limiting the invention.

EXAMPLE I

Preparation of mix

One hundred thirty-four grams of potassium iodide and ninety-seven grams of polyvinylidine fluoride resin obtained from Pennsalt chemicals and identified as Kynar, were dissolved in 662 grams of dimethyl formamide. The mixture was stirred until the potassium iodide was dissolved and then 97 grams of finely ground strong base polystyrene ethylene glycol dimethacrylate anion exchange resin identified as Ionac A-540 was added and thoroughly mixed to form a heterogenous mixture.

Coating

A polyester fiber cloth having a basis weight of 2.16 ounces per square yard and a thickness of about 5.0 mils was cut into strips 8 inches wide by 4 to 4½ feet in length. The heterogenous mix prepared above was transferred to a trough, and the strips of cloth passed through the mix at a sufficient speed to completely coat the cloth. The coated cloth was then passed between stainless steel spacer bars having a separation of 12 mils therebetween in order to provide a substantially uniform film on each surface of the strip. The coated strip was then transferred to a drying oven having a temperature of about 100° C., and maintained at that temperature for about 5 minutes.

Pressing

After 5 minutes of drying, the strip was cut into 8 inch sections and each section was sandwiched between polyethylene terephthalate release sheets, which were then placed between a pair of smooth metal plates and held under a pressure of 250 pounds per square inch for seven minutes at 150° C., and then cooled to ambient temperature while maintaining the pressure. The cured membrane had a thickness of 3.5 mm.

After cooling the membrane was removed from the press and the edges trimmed.

Lixiviation

The membrane was immersed in 2 liters of demineralized water for a period of about 30 minutes at which point it was removed and immersed in 2 liters of fresh boiling demineralized water. After about 30 minutes a sample of lixiviating liquor was removed from the bath and tested by flame analysis for potassium iodide. The lixiviating cycle was repeated until there was no evidence of potassium iodide in the wash solution. After water lixiviation, the membrane was conditioned by soaking over night in a 0.1 normal sodium chloride solution.

The following example demonstrates the improved resistance to inorganic fouling under operating conditions of membranes made in accordance with this invention.

EXAMPLE II

Membranes made in accordance with Example I were assembled in a conventional electrodialysis unit in alternating relationship with conventional non-permeable cation membranes to form a multi-cell unit. The cation membranes consisted of Dacron cloth coated with a film of polyvinyl chloride binder having dispersed throughout about fifty weight percent of a finely divided strong acid, sulfonated polyestyrene-divinyl benzene cation exchange resin. Referring to the figure, electrodialysis unit 11 is shown with anion membranes A made in accordance with Example I and standard non-permeable cation membranes C alternately positioned approximately 40 mils apart to define therebetween cells 1-10. The membranes were spaced apart by means of polyvinyl chloride perimeter gaskets, not shown, of approximately 3 x 8 inches. These gaskets also formed a water tight seal around the periphery of said membranes to prevent leakage out of unit 11 and between cells 1-10. A pair of vinyl sheets 31 and 32 adapted for mounted platinized titanium electrodes 21 and 22 are positioned as shown to form an anode chamber 33 and cathode chamber 34 of approximately 62 mils. A test water solution having 920 p.p.m. total hardness calculated as $CaCO_3$, and comprising 832 p.p.m. $SO_4$ calculated as $CaCo_3$ and 235 p.p.m. Na calculated as $CaCo_3$ having a conductance of 1500 micromho 20° reference was introduced by a suitable inlet means 14, at the bottom of each cell. The test solution was caused to flow upwardly through each of cells 1-10 at the rate of 5.7 cm./sec. In the configuration shown, cells 1, 3, 5, 7, and 9 are dilution cells and cells 2, 4, 6, 8, and 10 are concentration cells. The effluent from the concentration cells is led away by suitable pipe means 16, to a waste storage tank for recirculation or disposal while effluent from the dilution cells is sent by pipe means 17, to service. Anode 21 and cathode 22 are positioned on either side of unit 11 in the manner shown and are electrically connected to a suitable electrical source for the passage of current normal to the vertical plane of said membranes. A suitable electrolyte (3 gms. NaCl per liter demineralized water) is caused to flow through anode chamber 33 and cathode chamber 34 for electrical connection between the electrodes and membranes. Unit 11 was operated at a test current of 1.2 amps.

The unit was operated continuously for 42 hours then disassembled, inspected, reassembled and operated for an additional 40 hours. The votlage required to maintain the test current was recorded at intervals during the test. The test results are set forth in Table 1 below.

As a comparison, the electrodialysis test was repeated under the same conditions using the same type of cathode membrane, but using standard, non-permeable anion exchange membranes manufactured by the Asahi DA2. The results of the test are also set forth in Table I below.

TABLE I

| | Voltage | |
|---|---|---|
| | Standard non-permeable anion membrane | Semi-permeable anion membrane made according to Ex. I |
| Initial | 14.4 | 10.8 |
| 1 hour | 14.7 | 10.0 |
| 1½ hours | 16.4 | 12.0 |
| 2½ hours | 18.4 | 12.2 |
| 4½ hours | 24.1 | 12.2 |
| 5½ hours | 25.4 | 12.2 |
| 42 hours | 36.3 | 15.9 |
| (Unit disassembled—examined—reassembled.) | | |
| Reassembly | 24.5 | 14.5 |
| 58 hours | 33.0 | 13.0 |
| 82 hours | 46.5 | 14.5 |

It was noted that the standard anion membranes after 42 hours and 82 hours of operation in the electrodialysis unit were very badly scaled, the results of inorganic fouling, and required acid washing to remove the scale. The anion membranes made according to Example I required no cleaning throughout the test and, although stained, no evidence of scaling was found.

The results of the test of the example as set forth in Table I clearly show the resistance to inorganic fouling of membranes made according to this invention, as well as the improved economical operations of electrodialysis units using membranes made according to this invention, in that the voltages required to maintain the test current of 1.2 amps were considerably lower than the voltages required using standard anion non-permeable membranes. The initial voltage required in units using membranes made according to this invention is lower initially and maintains its low rate throughout the test due to the low areal resistance of membranes made according to this invention as compared to the high areal resistance of conventional membranes and to the resistance to inorganic fouling of membranes made according to this invention.

The following example demonstrates the permeability of membranes made in accordance with this invention as compared with conventional non-permeable membranes.

EXAMPLE III

An anion membrane of Example I was tested for permeability of mounting the membrane in a diffusion cell which consisted of two sections which are abutted together in liquid tight relationship. In each section is a chamber and the abutting face of each section is provided with an opening which, when the sections are abutted together, forms a communicating passage of known diameter to each chamber. The membrane is positioned between the abutting faces of the cell sections so as to completely close off the communicating passage and to separate the cell chambers. In this manner a known area of the membrane (1.49 cm.$^2$) was exposed to liquid contact. In one chamber was placed 12 ml. .002 N $H_2SO_4$ and in the other was placed 12 ml. of demineralized water. The conductance of the demineralized water was determined at the beginning of the test and again after 10 minutes. The conductance of the demineralized water increased by 17 umhos which corresponded to permeation of membrane of 1.9 x 10$^{-6}$ gm. equi./hr./cm.$^2$.

The same test was repeated using a non-permeable anion membrane consisting of Dacron cloth coated with a film of polyvinyl chloride having dispersed therein about 50 weight percent strong base anion exchange resin identified as Ionac A–540, the same resin in substantially the same proportions as used in the membranes made in accordance with Example I. No increase in demineralized water conductance could be measured, even after 30 minutes.

EXAMPLE IV

An anion selective permeable membrane was prepared in accordance with the procedure set forth in Example I. The film forming solution consisting of 1000 grams of dimethyl formamide, 180 grams of polyvinylidene fluoride, 40 grams of potassium iodide and 180 grams of a strong base polystyrene-divinyl benzene resin identified as Ionac A–540 which had been finely ground was suspended therein. An inert support member consisting of polypropylene cloth, cut into strips in the manner of Example I was coated with the film forming solution and passed between spacer bars separated by a gap of 25 mils. The coated polypropylene cloth was dried and cured under pressure in the manner set forth in Example I and lixiviated in boiling demineralized water until analysis of the water indicated that no further potassium iodide was being removed from the membrane.

EXAMPLE V

A second membrane was made in the manner of Example IV, except that the film forming solution contained 50 grams of potassium iodide.

The membrane of Example IV and Example V were tested for hydrostatic water permeability in the following manner. A specimen of membrane was clamped horizontally in a rectangular frame cell, dividing the cell into an upper and lower chamber. Both chambers were filled with water and the upper chamber was connected to an aspirator bottle. A hydrostatic head pressure of 9 inches was imposed on the upper chamber and the volume of water transferred through the membrane.

The membrane made in accordance with Example IV had a water permeability of 71.5 mil per minute per square foot and the membrane made in accordance with Example V had a water permeability of 204 mil per minute per square foot. This is to be contrasted with conventional non-permeable membrane which has a water permeability of substantially 0.

EXAMPLE VI

A cation selectively permeable membrane was made in the manner of Example I. The film forming solution consisted of 180 grams of polyvinylidene fluoride and 40 grams of potassium iodide dissolved in 100 grams of dimethyl formamide. One hundred eighty grams of finely ground strong acid sulfonated polystyrene-divinyl benzene cation exchange resin identified as Ionac C–240 was added to the mix and dispersed therein.

The support member, polypropylene cloth of Example IV was coated and pressed and the membrane was lixiviated in the same manner as described in Example I.

EXAMPLE VII

A cation selectively permeable membrane was prepared in accordance with Example VI, except that the film forming solution contained 60 grams of potassium iodide.

The membrane of Example VI and Example VII were tested for water permeability in the manner described in Example V except that the head pressure in the upper chamber was 36 inches. The membrane of Example VI had a permeability of 27 mil per minute per square foot and the membrane of Example VII had a permeability of 72 mils per minute per square foot.

EXAMPLE VIII

A semi-permeable neutral membrane was made in the following manner. A film forming solution was made up in manner of Example I consisting of 360 grams of polyvinylidene fluoride and 50 grams of potassium iodide dissolved in 2000 grams of dimethyl formamide. Polypropylene cloth of Example IV was used as the inert support member and a film was formed therein by passing the cloth through a trough containing the film forming solution after which it was passed between spacer bars havinng a separation of 24 mils. The coated support member was dried, cured and lixiviated in boiling water in the manner of Example I.

Areal resistance of the membrane was determined in accordance with method 601.1 promulgated by the Office of Saline Water, U.S. Department of the Interior.

The areal resistance of the membrane was determined to be 6.5 ohms cm.$^2$.

EXAMPLE IX

A multi-film membrane was made in the following manner. Dacron cloth of Example I was passed through a film forming solution consisting of 162 grams of polyvinylidene chloride dissolved in 1500 grams of dimethyl formamide and having 378 grams of strongly acidic cation exchange resin of Example VII dispersed therein. After coating, the cloth was passed between spacer bars having a gap of 8 mils. The coated cloth was then dried in the manner of Example I. After drying, the coated cloth was recoated by passing it through a film forming solution consisting of 200 grams of polyvinylidene chloride and 150 grams of potassium iodide dissolved in 1500 grams of dimethyl formamide. The spacer bar gap in the second coating operation was 10 mils. After the second coating, the cloth was again dried and a third coating was applied in the same manner as the second coating. The coated cloth was then cured and lixiviated in the manner of Example I.

The areal resistance, determined in the manner of Example VIII was 5.2 ohms cm.$^2$.

EXAMPLE X

A bi-polar permeable membrane was made in the following manner. A film forming solution consisting of 310 grams of polyvinylidene fluoride and 600 grams of potassium iodide dissolved in 3000 grams of dimethyl formamide was prepared. Two hundred eight grams of the strong base anion exchange resin of Example IV and 345 grams of the strongly acid cation exchange resin of Example VII, both resins being finely divided, were dispersed into the film forming solution. The support member, a matte of polyester fibers was passed through the film and between spacer bars having a gap of 8 mils. The coated inert support member was cured in the manner of Example I and was lixiviated by soaking in running tap water for two hours, followed by an overnight soaking in sodium chloride. The areal resistance of the membrane was determined in the matter of Example VIII to be 4.1 ohms per centimeter squared.

Membranes made in accordance with this invention may be used in any conventional electrodialysis cell and although the description herein has been oriented toward the use of the inventive membranes for the production of potable water, it should be clear that the membranes of this invention can be used in other electrodialytic processes such as for example, the recovery of waste steel pickling acid, the purification of radioactive waste, the desalting of sugar juices, and the like where resistance to organic and inorganic fouling is desired. The method of producing membranes of this invention provides a means for producing membranes which are resistant to inorganic and organic fouling and for producing membranes in which the permselectiveness and the semipermeability can be readily and easily varied and controlled. Membranes made in accordance with this invention have excellent physical characteristics and have demonstrated the ability to operate for long periods of time at economical current densities and with little maintenance attention.

While the invention has been described herewith with reference to certain preferred embodiments thereof, it is to be understood that it may be otherwise embodied within the scope of the appended claims.

I claim:

1. A method for the production of open structured semipermeable membranes comprising the steps of:
   (a) dissolving a neutral uncrosslinked polymeric binder and a chemically inert, thermally stable inorganic salt in a common solvent characterized by high solvent action on said uncrosslinked polymer and said inorganic salt,
   (b) forming a thin film therefrom,
   (c) heat and pressure curing said film to form a solid substantially unfractured membrane, and
   (d) lixiviating said membrane with a solvent in which only said inorganic salt is soluble ot dissolve and remove at least a portion of said inorganic salt from said membrane to provide interstices within said membrane matrix thereby affording a desired degree of semi-permeability to said membrane, the open structure of said membrane being determined by the proportions of said inorganic salt and duration of lixiviation.

2. The method of claim 1 wherein said inorganic salt is selected from the group consisting of the iodides and bromides of the alkali metals.

3. The method of claim 1 wherein said inorganic salt comprises up to 80 weight percent of said binder.

4. The method of claim 1 wherein said inorganic salt comprises about 50 weight percent of said binder.

5. The method of claim 1 wherein said inorganic salt is potassium iodide.

6. The method of claim 1 wherein said film is dried at a temperature ranging from ambient to about 150° C., to remove at least a major portion of said common solvent prior to heat and pressure curing said film.

7. The method of claim 6 wherein said film is dried until about 95 percent of said common solvent is removed from said film, the remaining 5 percent of said common solvent being retained in said film to plasticize said binder.

8. The method of claim 1 wherein said film is cured at a pressure of about 100 p.s.i. to about 500 p.s.i. and at a temperature ranging from about 100° C. to about 200° C. for sufficient time to substantially completely cure said binder.

9. The method of claim 1 wherein particles of ion exchange material are dispersed in said film.

10. The method of claim 1 wherein up to 80 weight percent of finely ground ion exchange material is dispersed in said film forming solution.

11. The method of claim 1 wherein said binder is a neutral thermoplastic polymer selected from the group consisting of polyvinylidene fluoride, polyvinylidene chloride, polyvinyl chloride, polyvinyl acetate and mixtures thereof.

12. The method of claim 1 wherein said binder is polyvinylidene fluoride.

13. The method of claim 1 wherein said common solvent is selected from the group consisting of dimethyl formamide, dimethyl acetamide, dimethyl sulfoxide, propylene carbonate, butyrolactone, tetrahydrofuran, methyl ethyl ketone, acetone, methyl propyl ketone and homologues thereof.

14. The method of claim 1 wherein said lixiviating solvent is selected from the group consisting of water, primary, secondary, tertiary alcohols and chloroform.

15. A method for the production of open structured, semi-permeable membranes comprising the steps of:
 (a) dissolving a neutral uncrosslinked polymeric binder and an inorganic salt in a common solvent,
 (b) forming a heterorgenous mixture of said binder and salt solution with from 0 to 80 percent of finely ground ion exchange material,
 (c) forming a thin film therefrom,
 (d) drying said thin film at a temperature ranging from ambient to about 150° C., to remove at least a major portion of said common solvent therefrom,
 (e) forming and drying at least one overlying thin film on said first thin film to form a multi-layered structure, said overlying thin film formed from a heterogenous mixture comprising said binder-salt solution and from 0 to 80 percent of said ion exchange material,
 (f) heat and pressure curing said multi-layered structure to form a solid, substantially unfractured membrane, and
 (g) lixiviating said membrane with a solvent in which only said inorganic salt is soluble to dissolve and remove at least a portion of said inorganic salt from said membrane, the open structure of said membrane being determined by the proportions of said inorganic salt and duration of lixiviation.

References Cited
UNITED STATES PATENTS

| | | | |
|---|---|---|---|
| 3,615,024 | 10/1971 | Michaels | 210—490 |
| 3,642,668 | 2/1972 | Bailey et al. | 260—2.5 M |
| 2,810,932 | 10/1957 | Honey et al. | 264—49 |

WILLIAM D. MARTIN, Primary Examiner

T. G. DAVIS, Assistant Examiner

U.S. Cl. X.R.

117—63, 65.2, 98

PO-1050
(5/69)

UNITED STATES PATENT OFFICE
CERTIFICATE OF CORRECTION

Patent No. 3,817,772     Dated June 18, 1974

Inventor(s) Allyn H. Heit

It is certified that error appears in the above-identified patent and that said Letters Patent are hereby corrected as shown below:

Column 9, line 67, "of" should be -- by --.

Column 11, line 16, "therein" should be -- thereon --.

Column 12, line 29, "ot" should be -- to --.

Signed and sealed this 3rd day of December 1974.

(SEAL)
Attest:

McCOY M. GIBSON JR.
Attesting Officer

C. MARSHALL DANN
Commissioner of Patents